United States Patent
Chen et al.

(10) Patent No.: US 10,489,335 B1
(45) Date of Patent: Nov. 26, 2019

(54) APPARATUS AND METHOD AND COMPUTER PROGRAM PRODUCT FOR ACCESSING A MEMORY CARD

(71) Applicant: Silicon Motion, Inc., Hsinchu County (TW)

(72) Inventors: Wen-Han Chen, Hsinchu County (TW); Hsing-Lang Huang, Hsinchu County (TW); Guo-Rung Huang, Hsinchu County (TW)

(73) Assignee: SILICON MOTION, INC., Hsinchu County (TW)

( * ) Notice: Subject to any disclaimer, the term of this patent is extended or adjusted under 35 U.S.C. 154(b) by 0 days.

(21) Appl. No.: 16/256,163

(22) Filed: Jan. 24, 2019

Related U.S. Application Data

(60) Provisional application No. 62/738,405, filed on Sep. 28, 2018.

(30) Foreign Application Priority Data

Nov. 6, 2018 (CN) .......................... 2018 1 1315197

(51) Int. Cl.
| | | |
|---|---|---|
| *G06F 13/40* | (2006.01) | |
| *G06K 7/00* | (2006.01) | |
| *G06F 13/38* | (2006.01) | |
| *G06F 3/06* | (2006.01) | |
| *G06F 12/02* | (2006.01) | |

(52) U.S. Cl.
CPC ........ *G06F 13/4081* (2013.01); *G06F 3/0607* (2013.01); *G06F 3/0661* (2013.01); *G06F 3/0679* (2013.01); *G06F 12/0246* (2013.01); *G06F 13/387* (2013.01); *G06K 7/0052* (2013.01); *G06K 7/0095* (2013.01); *G06F 2212/7202* (2013.01); *G06F 2213/0042* (2013.01); *G06F 2213/3804* (2013.01); *G06F 2213/3852* (2013.01)

(58) Field of Classification Search
CPC .. G06F 13/4081; G06F 3/0607; G06F 3/0661; G06F 3/0679; G06F 12/0246; G06F 13/387; G06K 7/0053; G06K 7/0095
USPC .......................................................... 710/302
See application file for complete search history.

(56) References Cited

U.S. PATENT DOCUMENTS

| | | | | | |
|---|---|---|---|---|---|
| 4,858,117 | A | * | 8/1989 | DiChiara | G06F 13/126 711/208 |
| 6,006,289 | A | * | 12/1999 | James | G06F 13/4059 370/431 |
| 6,311,320 | B1 | * | 10/2001 | Jibbe | G06F 9/45512 717/111 |
| 7,200,546 | B1 | * | 4/2007 | Nourmohamadian | G06F 3/0607 360/49 |

(Continued)

*Primary Examiner* — Paul R. Myers
(74) *Attorney, Agent, or Firm* — Birch, Stewart, Kolasch & Birch, LLP

(57) ABSTRACT

The invention introduces an apparatus for accessing a memory card to at least include a host interface and a processing unit. The processing unit is arranged to operably inspect whether a logical block length utilized in a memory card inserted into a card reader can be supported by a host; and reply to the host with sense data that advises the host not to perform a subsequent write into the memory card through the host interface in response to a request sense command when the logical block length utilized in the memory card cannot be supported by the host.

20 Claims, 7 Drawing Sheets

(56) References Cited

U.S. PATENT DOCUMENTS

| | | | |
|---|---|---|---|
| 7,603,530 B1 * | 10/2009 | Liikanen | G06F 11/2084 |
| | | | 711/156 |
| 8,321,386 B1 * | 11/2012 | Jobanputra | H03M 7/6058 |
| | | | 707/693 |
| 2004/0030808 A1 * | 2/2004 | Okaue | G06F 3/0607 |
| | | | 710/3 |
| 2005/0270856 A1 * | 12/2005 | Earhart | G11B 27/11 |
| | | | 365/189.05 |
| 2006/0285559 A1 * | 12/2006 | Cheng | H04N 21/4122 |
| | | | 370/522 |
| 2007/0183198 A1 * | 8/2007 | Otsuka | G06F 3/0622 |
| | | | 365/185.04 |
| 2013/0191601 A1 * | 7/2013 | Peterson | G06F 12/0868 |
| | | | 711/137 |

* cited by examiner

US 10,489,335 B1

APPARATUS AND METHOD AND COMPUTER PROGRAM PRODUCT FOR ACCESSING A MEMORY CARD

CROSS-REFERENCE TO RELATED APPLICATIONS

This application claims the benefit of priority to U.S. Provisional Application Ser. No. 62/738,405, filed on Sep. 28, 2018; and Patent Application No. 201811315197.2, filed in China on Nov. 6, 2018; the entirety of which is incorporated herein by reference for all purposes.

BACKGROUND

The disclosure generally relates to data access and, more particularly, to apparatus, method and computer program product for accessing a memory card.

Card readers are interface devices that are used to facilitate interaction between a memory card, such as a Compact Flash (CF), Secure Digital (SD), micro SD, or Multi Media Card (MMC) card, etc., and a computer host so that data stored in the memory cards can be accessed by the computer host and stored in the computer host. The computer host may drive the card reader via a Universal Serial Bus (USB) port of the computer host. Most card readers also offer write capability. In order to access a variety of memory cards of different formats, card readers may detect capabilities and specifications of a memory card and report its profile and operating statuses to the computer host accordingly. However, the computer host may not support particular memory card capabilities and mistakenly access, or even worse damage, data stored in the memory card. Thus, it is desirable to have an apparatus, a method and a computer program product for accessing a memory card to avoid damage to data stored in the memory card.

SUMMARY

In an aspect of the invention, an apparatus for accessing a memory card is introduced to at least include: a host interface and a processing unit. The processing unit is arranged to operably inspect whether a logical block length utilized in a memory card inserted into a card reader can be supported by a host; and reply to the host with sense data that advises the host not to perform a subsequent write into the memory card through the host interface in response to a request sense command when the logical block length utilized in the memory card cannot be supported by the host.

In another aspect of the invention, a computer program product for accessing a memory card is introduced to at least include program code to: inspect whether a logical block length utilized in a memory card inserted into a card reader can be supported by a host; and reply to the host with sense data that advises the host not to perform a subsequent write into the memory card in response to a request sense command when the logical block length utilized in the memory card cannot be supported by the host.

In another aspect of the invention, a method for accessing a memory card is introduced to at least include the steps: inspecting whether a logical block length utilized in a memory card inserted into a card reader can be supported by a host; and replying to the host with sense data that advises the host not to perform a subsequent write into the memory card in response to a request sense command when the logical block length utilized in the memory card cannot be supported by the host.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
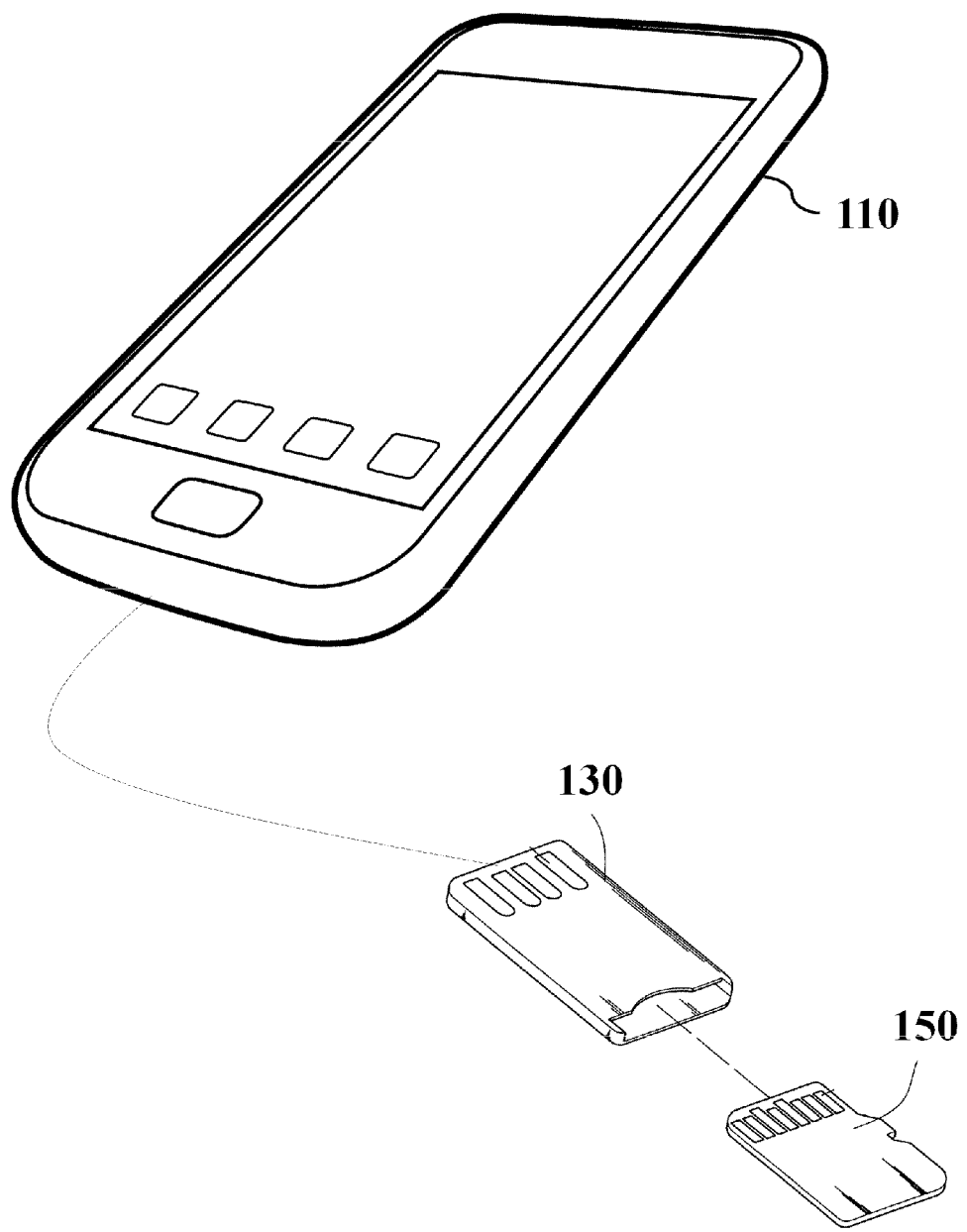
FIG. 1 is a schematic diagram of a data access system according to an embodiment of the invention.

Refer to FIG. 1. The data access system may include a mobile phone to perform operations as a host 110. Although the embodiments describe a mobile phone as an example, those artisans may practice the host 110 in a Personal Computer (PC), a laptop PC, a notebook, a digital camera, a digital recorder, or other consumer electronic products. The host 110 may connect to and drive a card reader 130 by Universal Serial Bus (USB) protocol. The memory card 150 may be inserted into the card reader 130, enabling the host 110 to access the memory card 150 through the card reader 130. The card reader 130 may be a removable-media mass storage subsystem, which connects to the host 110 via its USB port. The host 110 and the card reader 130 may communicate each other by exchanging command blocks, data, and status information as defined in a specification, for example, Universal Serial Bus Mass Storage Class: UFI Command Specification rev. 1.0. published on Dec. 14, 1998. The card reader 130 may retrieve and write data from and into the memory card 150 through Universal Flash Storage (UFS) protocol.

Figure 2:
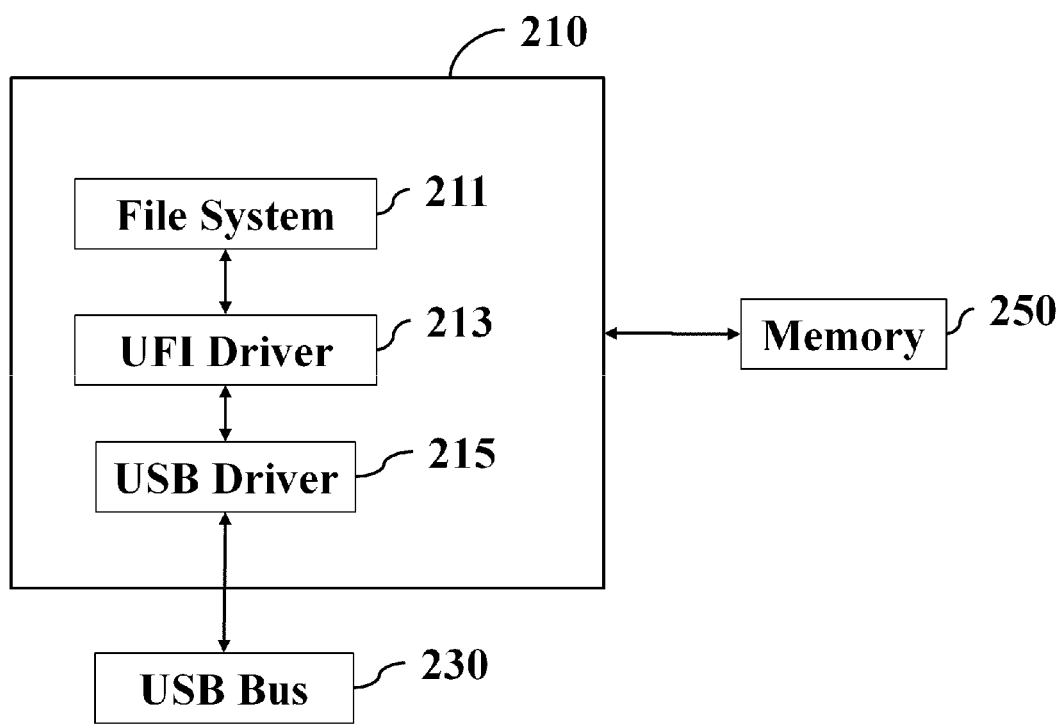
FIG. 2 is a block diagram illustrating a computer host.

Refer to FIG. 2. The host 110 may contain a processing unit 210 and an USB bus 230 capable of connecting to the card reader 130. The processing unit 210 performs designated functions when loading and executing software and/or firmware instructions of a file system 211, a UFI driver 213 and a USB driver 215. The file system 211 running on a particular operating system (OS) controls how data is stored and retrieved in and from the memory card 130. By separating data into logical pieces and giving each piece a name, the information is easily isolated and identified. Each group of data is called a file. The file system 211 uses a specified structure, such as FAT12, FAT16, FAT32, etc., and logical rules to manage the groups of information and their names. The UFI driver 213 controls the card reader 130 by sending it UFI command blocks defined by the specification. An UFI function module in the card reader 130 processes these command blocks. All exchanges of command block, data, and status information are carried out by the transfer of packets over the USB bus 230. The exchanges are managed by the USB Driver 215. The system architecture further includes a memory 250 for storing necessary data in execution, such as variables, data tables, data abstracts, or others. The memory 250 may be a Random Access Memory (RAM) of a particular type that provides volatile storage space.

Figure 3:
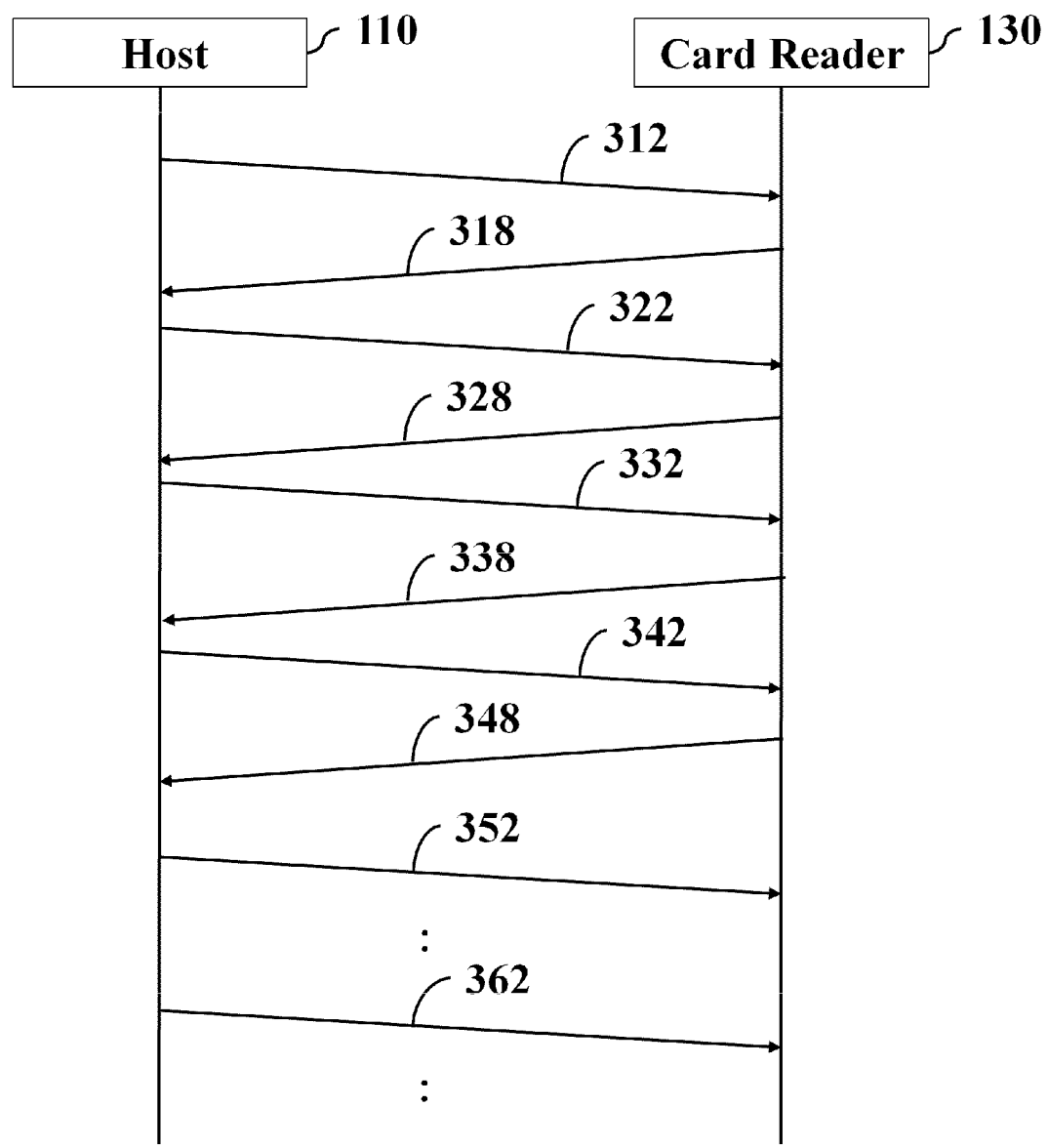
FIG. 3 is a sequence diagram illustrating interactions between a host and a card reader in some implementations.

When the memory card 150 is inserted into the card reader 130, the host 110 interacts with the card reader 130 for initiating a connection between the host 110 and the memory card 150. Refer to FIG. 3. In some implementations, when detecting that a device has plugged in its USB port, the host 110 issues a TEST UNIT READY command 312 to check if the plugged device is ready. Since the memory card 150 has not been inserted into the card reader 130, the card reader 130 replies to the host 110 with a CSW fail message 318. The host 110 issues a REQUEST SENSE command 322 to instruct the card reader 130 to transfer sense data to the host 110 for a specified logical unit. When detecting that the memory card 150 has been inserted into the card reader 130, the card reader 130 replies to the host 110 with sense data of MEDIA CHANGED 328. Then, the host 110 issues a TEST UNIT READY command 332 to check if the plugged device is ready again. Since the memory card 150 has not been inserted into the card reader 130, the card reader 130 replies to the host 110 with a CSW pass message 338. Then, the host 110 issues a READ CAPACITY command 342 to request the card reader 130 to provide capacities of the currently installed medium. The card reader 130 queries the memory card 150 about its capacity information, generates a current capacity descriptor 348 accordingly and replies to the host 110 with the current capacity descriptor 348, for example, the $0^{th}$ to $3^{rd}$ bytes record the total number of addressable blocks and the $5^{th}$ to $7^{th}$ bytes record the length in bytes of each logical block for the memory card 150. The length of each logical block may be 512, 1K, 2K, 4K bytes, or others. In a medium initiation operation, the host 110 calculates logical addresses of a boot sector, a file allocation table image and other required data according to the reported capacity information and issues a series of READ commands 352 to the card reader 130 for obtaining information about the boot sector, the file allocation table image and other system files from the logical addresses. Next, for subsequent operations, the host 110 modifies relevant portions of the boot sector, the file allocation table image and others and issues a series of WRITE commands 362 to the card reader 130 for writing the modified content back into the memory card 150.

However, when the OS or the file system 211 running on the host 110 cannot support longer logical blocks, all or portions of important information of the updated boot sector, file allocation table image and other system files may be lost, leading to the files stored in the memory card 150 being damaged. For example, the OS or the file system 211 has capabilities for processing data of logical blocks of 512 bytes but 4K bytes. Although the UFI driver 213 completely receives 4K-byte data of each logical block through the USB interface, the OS or the file system 211 may process the former 512-byte data of each logical block only and omit the remaining 3.5K-byte data of each logical block, leading to unexpected data losses after the modified boot sector, the file allocation table image and other system files are written back into the memory card 150.

Figure 4:
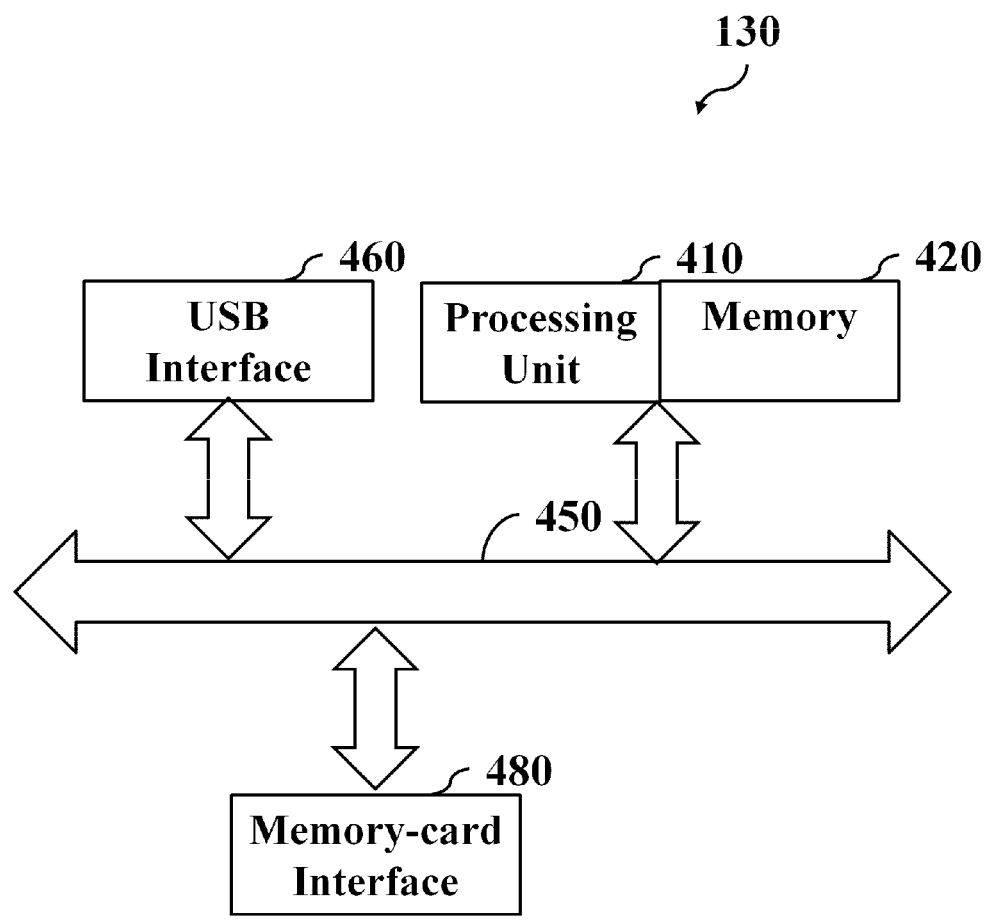
FIG. 4 is the system architecture of a card reader according to an embodiment of the invention.

To address the aforementioned problems, the card reader 130 requires fault prevention mechanism to avoid that the files stored in the memory card 150 that are organized in logical blocks of a particular length are damaged after the memory card 150 is connected to the host 110 that does not support the logical block length. Refer to FIG. 4. The card reader 130 at least includes a processing unit 410 that may be implemented in numerous ways, such as with dedicated hardware, or with general-purpose hardware (e.g.; a single processor, multiple processors or graphics processing units capable of parallel computations, or others) that is programmed using firmware or software instructions to perform the functions recited herein. The processing unit 410 may contain at least an arithmetic logic unit (ALU) and a bit shifter. The ALU is multifunctional device that can perform both arithmetic and logic function. The ALU is responsible for performing arithmetic operations, such as add, subtraction, multiplication, division, or others, Boolean operations, such as AND, OR, NOT, NAND, NOR, XOR, XNOR, or others, and mathematical special functions, such as trigonometric functions, a square, a cube, a power of n, a square root, a cube root, a n-th root, or others. Typically, a mode selector input decides whether ALU performs a logic operation or an arithmetic operation. The bit shifter is responsible for performing bitwise shifting operations and bitwise rotations. A memory 420 may be connected to the processing unit 10 through a high-performance bus and store necessary data in execution, such as variables, data tables. data abstracts, or others. The memory 420 may be a RAM of a particular type that provides volatile storage space.

A system bus 450 may be used to connect the processing unit 410, the memory 420, an USB interface 460 and a memory-card interface 480 and a communications protocol may be employed to transfer data therebetween. The USB interface 460 may include an USB Media Access Control (MAC) layer and an USB physical layer (PHY) for connecting to an USB port of the host 110. The processing unit 410 may load and execute corresponding UFI and USB drivers for receiving and interpreting UFI commands (such as TEST UNIT READY, READ CAPACITY, READ, WRITE, ERASE commands), logical block numbers, data and others sent by the host 110, and generating and transmitting UFI messages, descriptors, data and others to the host 110. The memory-card interface 480 may include a host-side controller (such as a SD or eMMC host-side controller) that is connected to the memory card 150. The memory card 410 may load and execute a corresponding UFS driver for generating and transmitting UFS commands (such as Read Capacity, Read, Write and Erase commands), logical block numbers, data and others to the memory card 150, and receiving and interpreting completion elements (CEs), data and others sent by the memory card 150.

The card reader 130 may perform a fault prevention method to avoid the aforementioned errors. The processing unit 410 inspects whether a logical block length utilized in the memory card 150 inserted into the card reader 130 can be supported by the host 110. When inspecting that the logical block length utilized in the memory card 150 cannot be supported by the host 110, the processing unit 410 replies to the host 110 with sense data that advises the host 110 not to perform subsequent writes into the memory card 150 through a host interface in response to a REQUEST SENSE command.

Figure 5:
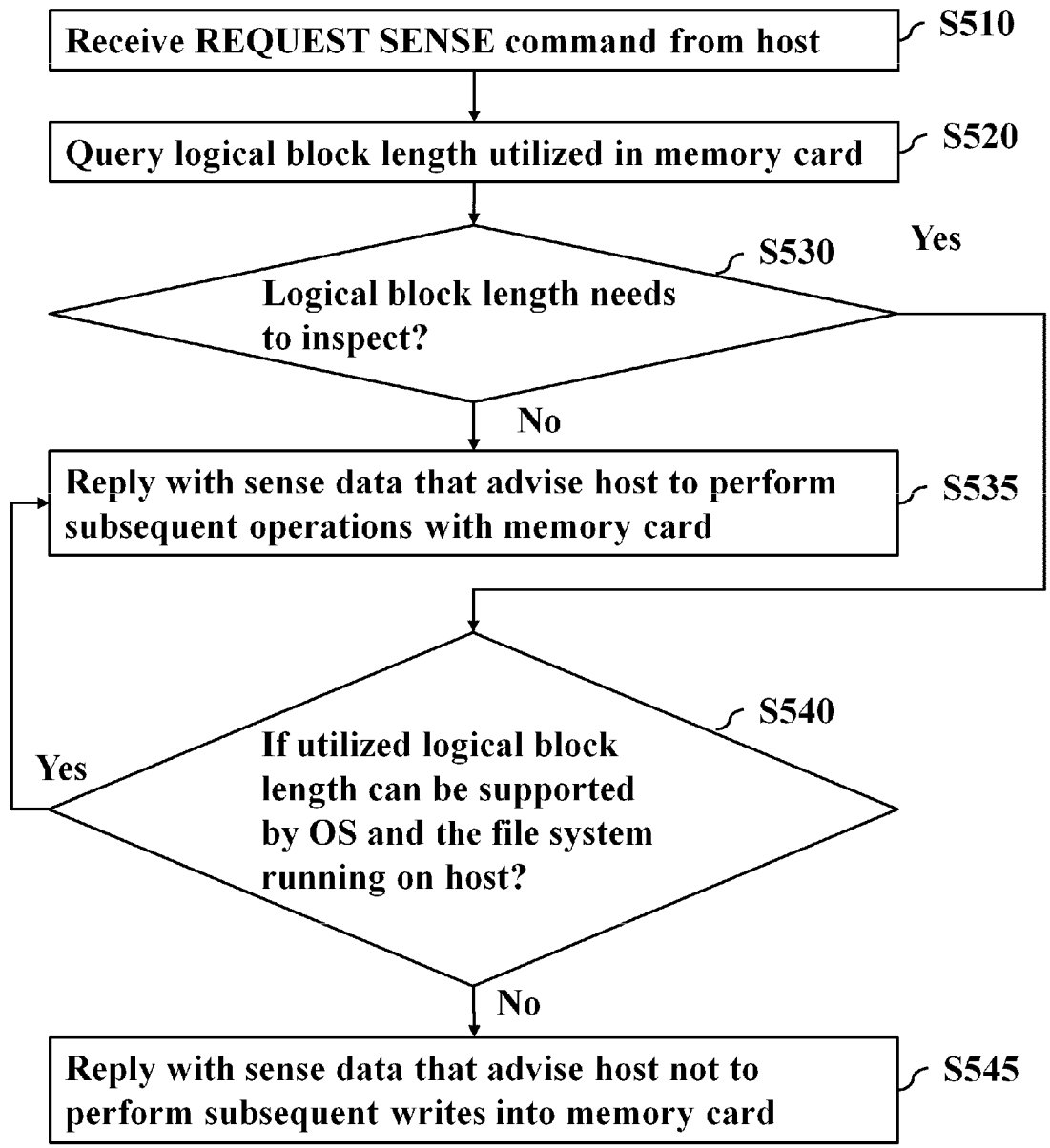
FIG. 5 is a flowchart illustrating a method for accessing a memory card according to an embodiment of the invention.

Detailed operations may refer to FIG. 5. After receiving a REQUEST SENSE command through the USB interface 460 from the host 110 (step S510), the processing unit 410 may query a logical block length utilized in the memory card 130 through the memory-card interface 480 (step S520). In step S520, the processing unit 410 may issue a Read Capacity command to request the memory card 130 to provide the current capacity thereof. The processing unit 410 may receive a Read Capacity Data Response from the memory card 130, in which a Logical Block Length thereof is carried in the $4^{th}$ to $7^{th}$ bytes. The Read Capacity command is a UFS SCSI command. It may be realized by those artisans to perform step S520 before step S510, and the invention should not be limited thereto. The processing unit 410 may store the Logical Block Length of the Read Capacity Data Response in the memory 420 until the memory card 150 is removed from the card reader 130.

When determining that the replied logical block length, for example, 512 bytes, is needless to inspect (the "No" path of step S530), the processing unit 410 may reply to the host 110 with sense data that advises the host 110 to perform subsequent operations with the memory card 150, for example, a Sense Key of MEDIA CHANGED (step S535). The Sense Key provides generic categories in which error and exception conditions can be reported.

When determining that the replied logical block length, for example, 2K bytes, needs to inspect and the logical block length utilized in the memory card 150 can be supported by the OS and the file system running on the host 110 (the "Yes" path of step S540 followed by the "Yes" path of step S530), the processing unit 410 may reply to the host 110 with sense data that advises the host 110 to perform subsequent operations with the memory card 150, for example, a Sense Key of MEDIA CHANGED (step S535).

When determining that the replied logical block length, for example, 4K bytes, needs to inspect and the logical block length utilized in the memory card 150 cannot be supported by the OS and the file system running on the host 110 (the "No" path of step S540 followed by the "Yes" path of step S530), the processing unit 410 may reply to the host 110 with sense data that advises the host 110 not to perform subsequent writes into the memory card 150, for example, a Sense Key of MEDIA NOT PRESENT or WRITE PROTECTED MEDIA to avoid the host 110 to update the boot sector, the file allocation table image or other system file (step S545). Therefore, the loss of all or portions of important linking information to the files stored in the memory card 150 may be prevented. The Sense Keys of MEDIA CHANGED, MEDIA NOT PRESENT and WRITE PROTECTED MEDIA may be represented by codes defined in the UFI specification.

Since different allocation lengths may be accepted in different OSs, the processing unit 110 may recognize which OS is running on the host 110 by inspecting a value of an allocation length field of a REQUEST SENSE command. The Allocation Length field of a REQUEST SENSE command specifies the maximum number of bytes of sense data the host 110 can receive. For example, the maximum numbers of bytes of sense data Android, Windows 7/10/XP and Mac OS running on the host 110 can receive are 96 (i.e. "0x60"), 18 (i.e. "0x12") and 18, respectively. Android or its file system does not support a logical block length of 4K bytes. Mapping information between unsupported OSs or file systems and to-be-checked logical block lengths may be stored in the memory 420 in arbitrary data structure, such as a data table, decision rules, or others, to facilitate the determinations by the processing unit 410. In alternative embodiments, the aforementioned mapping information may be hard coded in determination logics of program code. In step S540, for example, after detecting that a value of the allocation length field of a REQUEST SENSE command is "0x60", the processing unit 410 determines that the OS or file system running on the host 110 does not support the logical block length utilized in the inserted memory card 150. After detecting that a value of the allocation length field of a REQUEST SENSE command is "0x12", the processing unit 410 determines that the OS or file system running on the host 110 supports the logical block length utilized in the inserted memory card 150.

Figure 6:
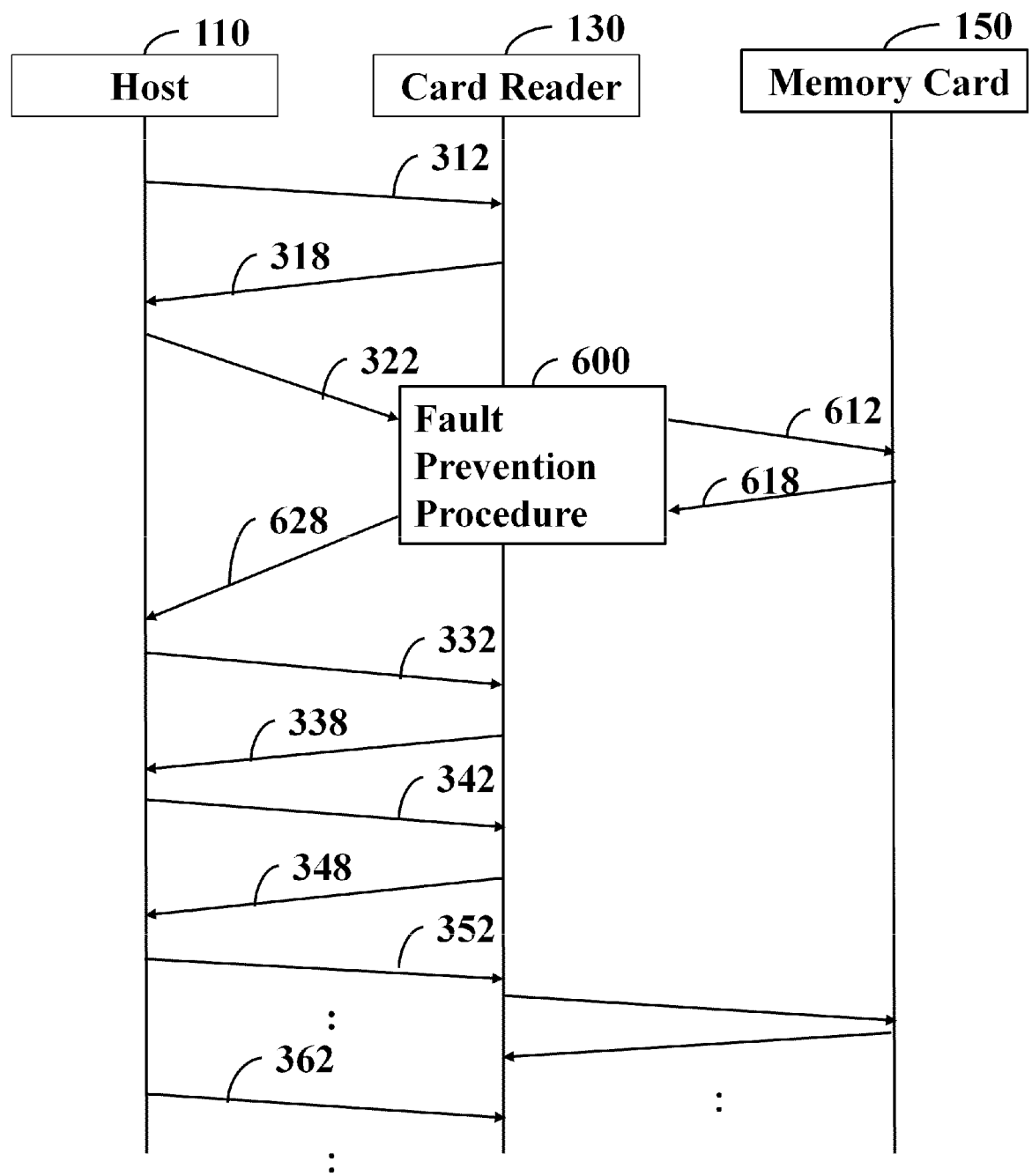
FIGS. 6-7 are sequence diagrams illustrating interactions between a host and a card reader according to an embodiment of the invention.

Refer to FIG. 6. After receiving a REQUEST SENSE command 322, the card reader 130 may launch a fault prevention procedure 600 practicing the flowchart as shown in FIG. 5. In the procedure 600, the processing unit 410 may complete a query of a logical block length to the memory card 150 by issuing a Read Capacity command 612 through the memory-card interface 480 to the memory card 150 and receiving a Read Capacity Data Response 618 therethrough from the memory card 150. It may be realized by those artisans that the issuance of the Read Capacity command 612, or the issuance of the Read Capacity command 612 and the reception of the Read Capacity Data Response 618 may be performed before the procedure 600 starts, and the invention should not be limited thereto. When determining that the replied logical block length does not need to inspect (the "No" path of step S530), or the replied logical block length needs to inspect and the OS and its file system running on the host 110 support the logical block length utilized in the memory card 150 (the "Yes" path of step S540 followed by the "Yes" path of step S530), the processing unit 410 may reply to the host 110 with sense data 628 that advises the host 110 to perform subsequent operations with the memory card 150 (step S535). The subsequent operations may include transmissions of a TEST UNIT READY command 332 and a READ CAPACITY command 342 and receptions of a relevant message 338 and a current capacity descriptor 348. The subsequent operations may further include reads, updates and writes for the boot sector, the file allocation table image and other system files.

Figure 7:
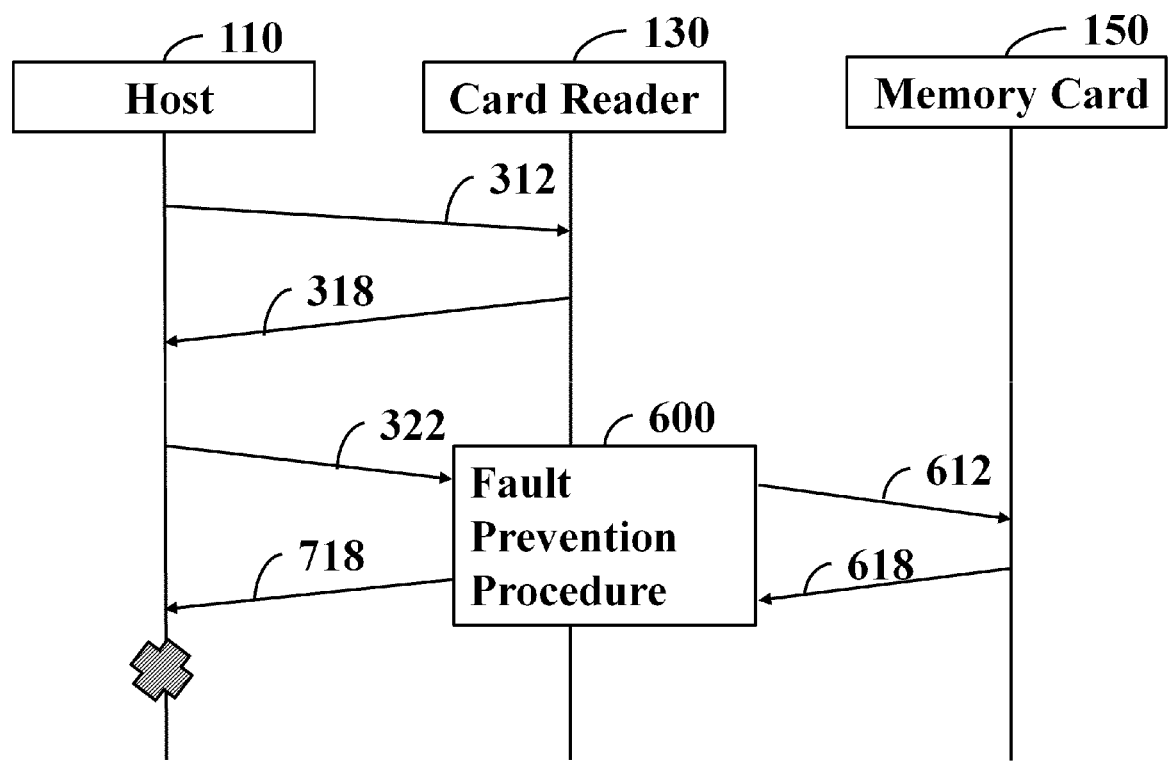

Refer to FIG. 7. In the procedure 600, when determining that the replied logical block length needs to inspect and the OS or its file system running on the host 110 does not support the logical block length utilized in the memory card 150 (the "No" path of step S540 followed by the "Yes" path of step S530), the processing unit 410 may reply to the host 110 with sense data 718 that advises the host 110 not to perform subsequent writes into the memory card 150, for example, a Sense Key of MEDIA NOT PRESENT or WRITE PROTECTED MEDIA (step S545). The subsequent writes may include reads, updates and writes for the boot sector, the file allocation table image and other system files.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIG. 4, it should be noted that additional elements may be included to achieve better performance without departing from the spirit of the invention. Each element of FIG. 4 is composed of various circuits and arranged to operably perform the aforementioned operations. While the process flow described in FIG. 5 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for accessing a memory card, comprising:
a host interface, coupled to a host; and
a processing unit, coupled to the host interface, arranged to operably inspect whether a logical block length utilized in a memory card inserted into a card reader can be supported by a host; and reply to the host with sense data that advises the host not to perform a subsequent write into the memory card through the host interface in response to a request sense command when the logical block length utilized in the memory card cannot be supported by the host.

2. The apparatus of claim 1, comprising:
a memory-card interface, coupled to the processing unit, wherein the processing unit is arranged to operably obtain the logical block length utilized in the memory card by querying the memory card through the memory-card interface.

3. The apparatus of claim 1, wherein the processing unit is arranged to operably reply to the host with sense data that advises the host to perform subsequent operations with the memory card through the host interface in response to a request sense command when the logical block length utilized in the memory card does not need to inspect.

4. The apparatus of claim 1, wherein the processing unit is arranged to operably reply to the host with sense data that advises the host to perform subsequent operations with the memory card through the host interface in response to a request sense command when the logical block length utilized in the memory card needs to inspect and the logical block length utilized in the memory card can be supported by an Operating System and a file system running on the host.

5. The apparatus of claim 4, wherein the sense data that advises the host to perform subsequent operations with the memory card is a sense key of MEDIA CHANGED.

6. The apparatus of claim 1, wherein the processing unit is arranged to operably reply to the host with sense data that advises the host not to perform a subsequent write into the memory card through the host interface in response to a request sense command when the logical block length utilized in the memory card needs to inspect and the logical block length utilized in the memory card cannot be supported by an Operating System or a file system running on the host.

7. The apparatus of claim 6, wherein the sense data that advises the host not to perform the subsequent write into the memory card is a sense key of MEDIA NOT PRESENT or WRITE PROTECTED MEDIA.

8. The apparatus of claim 1, wherein the processing unit is arranged to operably detect a value of an allocation length field of the request sense command sent by the host so as to inspect whether the logical block length utilized in the memory card can be supported by the host.

9. A non-transitory computer program product for accessing a memory card when executed by a processing unit of a card reader, comprising program code to:
inspect whether a logical block length utilized in a memory card inserted into a card reader can be supported by a host; and
reply to the host with sense data that advises the host not to perform a subsequent write into the memory card in response to a request sense command when the logical block length utilized in the memory card cannot be supported by the host.

10. The non-transitory computer program product of claim 9, comprising program code to:
obtain the logical block length utilized in the memory card by querying the memory card.

11. The non-transitory computer program product of claim 9, comprising program code to:
reply to the host with sense data that advises the host to perform subsequent operations with the memory card in response to a request sense command when the logical block length utilized in the memory card does not need to inspect.

12. The non-transitory computer program product of claim 9, comprising program code to:
reply to the host with sense data that advises the host to perform subsequent operations with the memory card in response to a request sense command when the logical block length utilized in the memory card needs to inspect and the logical block length utilized in the memory card can be supported by an Operating System and a file system running on the host.

13. The non-transitory computer program product of claim 12, wherein the sense data that advises the host to perform subsequent operations with the memory card is a sense key of MEDIA CHANGED.

14. The non-transitory computer program product of claim 9, comprising program code to:
reply to the host with sense data that advises the host not to perform a subsequent write into the memory card in response to a request sense command when the logical block length utilized in the memory card cannot be supported by an Operating System or a file system running on the host.

15. The non-transitory computer program product of claim 14, wherein the sense data that advises the host not to perform the subsequent write into the memory card is a sense key of MEDIA NOT PRESENT or WRITE PROTECTED MEDIA.

16. The non-transitory computer program product of claim 9, comprising program code to:
detect a value of an allocation length field of the request sense command sent by the host so as to inspect whether the logical block length utilized in the memory card can be supported by the host.

17. A method for accessing a memory card, performed by a processing unit of a card reader, comprising:
inspecting whether a logical block length utilized in a memory card inserted into a card reader can be supported by a host; and
replying to the host with sense data that advises the host not to perform a subsequent write into the memory card in response to a request sense command when the logical block length utilized in the memory card cannot be supported by the host.

18. The method of claim 17, comprising:
replying to the host with sense data that advises the host not to perform a subsequent write into the memory card in response to a request sense command when the logical block length utilized in the memory card cannot be supported by an Operating System or a file system running on the host.

19. The method of claim 18, wherein the sense data that advises the host not to perform the subsequent write into the memory card is a sense key of MEDIA NOT PRESENT or WRITE PROTECTED MEDIA.

20. The method of claim 17, comprising:
detecting a value of an allocation length field of the request sense command sent by the host so as to inspect whether the logical block length utilized in the memory card can be supported by the host.

* * * * *